United States Patent [19]

Eger et al.

[11] Patent Number: 4,998,228

[45] Date of Patent: Mar. 5, 1991

[54] DRINKING WATER FILTER

[75] Inventors: Douglas R. Eger, Montgomery, Tex.; Scott S. Bair, Atlanta, Ga.

[73] Assignee: Douglas R. Eger, Houston, Tex.

[21] Appl. No.: 478,096

[22] Filed: Feb. 9, 1990

[51] Int. Cl.$^5$ .......................... G04B 47/00; G04F 1/04
[52] U.S. Cl. .......................................... 368/10; 368/93
[58] Field of Search ...................... 368/10, 65, 93, 95, 368/89, 227; 210/282, 232, 238, 287, 289

[56] References Cited

U.S. PATENT DOCUMENTS

| | | | |
|---|---|---|---|
| 3,025,665 | 3/1962 | Dock et al. | 58/144 |
| 3,553,959 | 1/1971 | Young et al. | 58/144 |
| 3,945,923 | 3/1976 | Rogers et al. | 210/253 |
| 4,090,356 | 5/1978 | Arnold | 58/144 |
| 4,228,649 | 10/1980 | Weiss | 368/93 |
| 4,306,971 | 12/1981 | Hankammer | 210/282 |

*Primary Examiner*—Vit W. Miska
*Attorney, Agent, or Firm*—Browning, Bushman, Anderson & Brookhart

[57] ABSTRACT

A water filtration system, and a filter and timer therefor. The system includes a primary container defining a holding chamber and a secondary chamber defining a filtering chamber at least partially within the holding chamber but spaced above the bottom wall of the holding chamber. The filter assembly is removably connected to the secondary container and comprises a cannister containing a filter disposed generally below the lower end of the filtering chamber, the cannister having inlet means communicating with the filtering chamber and outlet means disposed below the inlet means and communicating with the holding chamber. The timer is connected to the filter and includes a tube with an indicator movable longitudinally therein through a non-gaseous fluid having a specific gravity different than that of the indicator.

52 Claims, 3 Drawing Sheets

DRINKING WATER FILTER

BACKGROUND OF THE INVENTION

1. Field of the Invention

The present invention pertains to the filtration of water, primarily for drinking purposes.

2. Description of the Background

The importance and desirability of filtering water prior to drinking is becoming increasingly apparent. Water which is classified as potable nevertheless often contains chemicals or other substances which, while not necessarily likely to cause immediate life-threatening illness, may nevertheless be less than ideal in terms of the long-term health of the consumer and may also make the water aesthetically unpleasing.

One of the best filtering media is activated carbon, and carbon filters, for filtering air, water and other substances, are well known. One is shown in U.S. Pat. No. 4,306,971. However, a carbon filtering medium has a limited life in two respects: first, the life of the carbon, in terms of its ability to continue to adsorb contaminants and the like, is limited. Secondly, and especially where the carbon is being used to filter water, bacterial growth can occur in the carbon after a certain period of time, which also, therefore, limits the life of the carbon for purposes of filtering water which is to be consumed.

In the past, it has been known to protect carbon in filters against bacterial growth by the use of silver in association with the carbon. However, it is now known that the silver is dangerous, and should not be used in a filter for handling drinking water.

For both of these reasons, it is desirable that there be a simple and inexpensive way to time the life of a filter to alert the consumer when it is time for the filter to be changed. It is especially desirable that the timer be connected with the filter itself, and that the filter and timer be adapted for use in a filtering container so that the indication that the filter should be changed can be readily observed by a consumer without trouble and without disturbing the timer, filter and/or container.

It has been known, for other purposes, to provide timers which operate on the general principle of an indicator member moving lengthwise along a tube filled with a fluid having a specific gravity different from that of the indicator. Such devices are shown in U.S. Pat. No. 3,025,665; U.S. Pat. No. 3,553,959; U.S. Pat. No. 4,090,356; and U.S. Pat. No. 4,228,649. In some of these devices, the indicator has a lower specific gravity than that of the fluid, so that it rises in the tube, whereas in others, the indicator has a higher specific gravity so that it falls in the tube.

The timers disclosed in these prior patents are intended for other uses, typically uses over much shorter ranges of time than the life of a water filter, and under circumstances in which there is no particular problem in providing for ready visibility of the position of the indicator along the tube.

Also, these devices are intended to be reset and reused, which is typically done by inverting the tube so as to allow the indicator to begin travel from the opposite end of the tube from that employed in its last longitudinal movement.

However, a timer associated with a water filter should not be resettable, so that the consumer cannot inadvertently use the filter beyond its intended life. On the other hand, the travel of the indicator in a water filter should not begin prematurely, i.e. before the filter is put into use, so that the consumer will not replace and discard the filter too soon. Furthermore, inversion is not a desirable way even to initially set the position of an indicator in the context of a water filtration system. Therefore, there is need for a means for positively fixing such an indicator at the beginning of its intended stroke of travel, but with such a means being readily releasable when the filter is put into use.

SUMMARY OF THE INVENTION

The present invention provides a water filtration system suitable for home or other consumer use, as well as a filter and a timer for the filter, all of which are particularly well adapted for consumer filtration of water intended for drinking purposes.

The overall system includes a primary container having a bottom wall and side walls defining a holding chamber. A secondary container defines a filtering chamber having upper and lower ends. The secondary container is mounted on the primary container at least partially within the holding chamber but with the filtering chamber spaced above the bottom wall of the primary container.

A filter assembly is connected to the secondary container. The filter assembly comprises a cannister containing filter means disposed generally below the lower end of the filtering chamber. The cannister has inlet means communicating with the filtering chamber and outlet means, disposed below the inlet means, and communicating with the holding chamber. Thus, water placed in the filtering chamber will pass, by gravity, through the filter and into the holding chamber until it is removed for drinking purposes.

The timer, which is also gravity operated, is connected with the cannister and operative to produce a visual indication, visible from above the primary container, when the filter nears the end of its life.

More specifically, the timer includes a tube connected with the cannister and having upper and lower ends. An indicator member, in the tube, is sized for lengthwise movement in the tube. A non-gaseous fluid substantially fills the portion of the tube not occupied by the indicator member. This fluid has a specific gravity different than that of the indicator member, preferably greater than that of the indicator member so that the latter will rise in the tube and be visible from above the primary container. The relative physical properties of the indicator member, the fluid and the tube, e.g. the viscosity of the fluid, the shape of the indicator member, and the clearance between the indicator member and the inner walls of the tube, are adapted to time the travel of the indicator member along the length of the tube to correspond to the life of the filter means. If the indicator member has a lengthwise flowway, its internal size can be used to control the travel, reducing difficulties of close external tolerances.

The tube preferably extends upwardly to or beyond the top of the cannister so that the upper end of the tube, which serves as its viewing portion, can be readily seen by looking down into the filtering chamber.

Preferably, the timer has a transparent window across the upper end of the tube and disposed for visibility from above the filter. This allows the consumer to easily see if the indicator has reached the end of its travel even though the entire filter and timer may remain within the primary and/or secondary containers, or even under water. To enhance this easy visibility, the indicator member may have a pigmented surface visible through the window when the indicator is disposed adjacent thereto, and the fluid may have a contrasting pigment.

A releasable retainer means is provided for temporarily holding the indicator member adjacent one end, preferably the lower end, of the tube. In a preferred embodiment, a self-healing seal is disposed in a wall of the tube and closes the tube adjacent its lower end, and the retainer means comprises a retainer pin extending through the seal and into the indicator member. When a new filter is put into use, the consumer first removes the pin, thereby releasing the indicator member for its lengthwise travel along the tube. The self-healing seal immediately closes the space previously occupied by the pin as the pin is removed so that the fluid does not leak from the tube. A grip may be provided for facilitating removal of the pin, or the pin may be arranged for automatic removal when a new filter is taken from its package.

Accordingly, a principal object of the invention is to provide an improved water filtration system particularly well adapted for consumer filtering of drinking water.

Another object of the invention is to provide a filter for drinking water which has a timer, indicative of the life of the filtering medium, incorporated therewith.

A further object of the present invention is to provide such a timer with means for positively preventing movement of the indicator until the filter is put into use.

Still another object of the present invention is to provide such a timer in which a visual indication of the end of the life of the filtering medium is conspicuous when viewing the timer from above a water container in which it is disposed for use.

Yet another object of the invention is to provide such a timer with an indicator member having a lengthwise flowway.

Still other objects, features and advantages of the invention will be made apparent by the following detailed description, the drawings and the claims.

DETAILED DESCRIPTION

Figures 1, 4, 5:
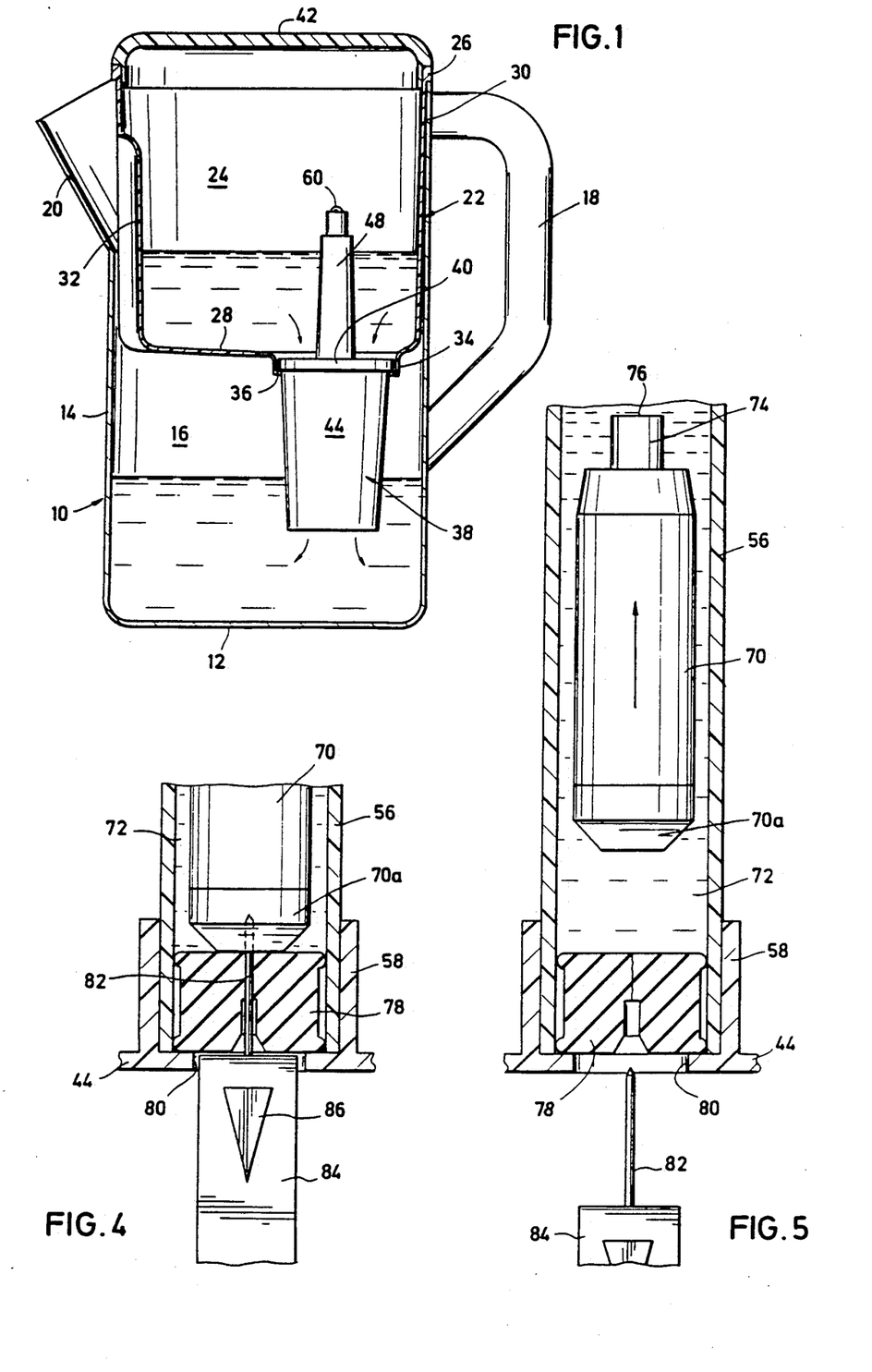
FIG. 1 is a longitudinal cross-sectional view of a water filtration system according to the present invention, showing the filter assembly in elevation.
FIG. 4 is an enlarged longitudinal cross-sectional view through the self-healing seal and retainer pin prior to release.
FIG. 5 is a view similar to that of FIG. 4 subsequent to release.

Referring first to FIG. 1, an overall water filtration system, intended primarily for consumer use in filtering water for drinking purposes, comprises a primary container 10 which is generally in the form of a pitcher adapted to receive and cooperate with the remainder of the system. The container 10 includes a bottom wall 12 and side walls 14 defining a holding chamber 16 for holding the water which has already been filtered. Container 10 also has a handle 18 and a spout 20.

The system further includes a secondary container 22. This container defines in its interior a filtering chamber 24 in which water can be placed for filtering. At its upper end, the container 22 has an outwardly projecting flange 26 which is sized and shaped to rest on the upper edge of the pitcher 10 and suspend the container 22 therein. This positions the container 22 at least partially within the holding chamber 16, and more specifically in the preferred embodiment shown, virtually entirely within the primary container 10. The size of the container 22 is such that, when so suspended from the upper edge of the pitcher 10, the filtering chamber 24 is spaced substantially above the bottom wall 12 of the pitcher 10. Terms such as "above," "below," "upper," and "lower" are used herein for convenience to denote the parts of the apparatus when the apparatus is positioned for normal use, as shown in the drawings, and should not be construed so as to otherwise limit the scope of the claims.

The side walls 30 of the secondary container 22, which are otherwise generally cylindrical, include a generally longitudinally extending, radially inwardly projecting portion 32, aligned with spout 20 in use, which forms, on the exterior of container 22, a groove to permit water to pass more readily from the holding chamber 16 past the secondary container 22 and through the spout 20 so that container 22 does not have to be removed to draw water for use.

The bottom wall 28 of the secondary container 22 has an opening defined by an annular downwardly projecting rim 34 from which an annular flange 36 extends laterally inwardly. The filter assembly 38, to be described more fully below, is mounted on the secondary container 22 by means of a flange 40 thereof sized to rest on flange 36. Flange 40 is also sized so as to form a friction-type seal against rim 34.

A cover 42 is provided for closing the upper end of container 22, and thereby also closing container 10, for the usual purposes.

Figures 2, 3:
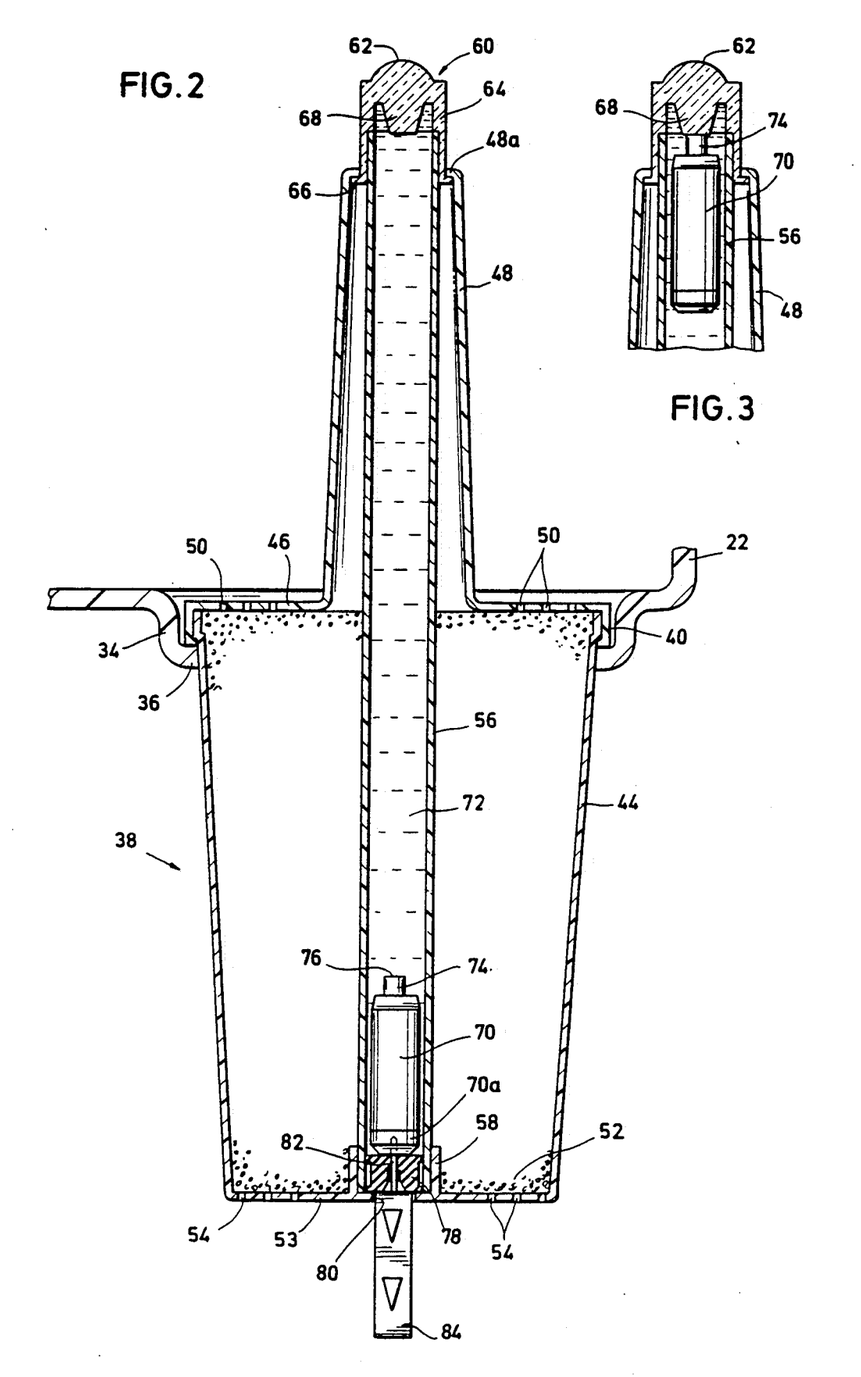
FIG. 2 is an enlarged longitudinal cross-sectional view through the filter assembly prior to release of the indicator member.
FIG. 3 is a detailed cross-sectional view of the upper portion of the apparatus shown in FIG. 2 and showing the indicator member at the end of its travel seated against the window.

Referring now to FIG. 2 in conjunction with FIG. 1, the filter assembly 38 and its use will be described in greater detail. Filter 38 includes a cannister comprising a barrel portion 44 and a cover 46. The cover 46 includes the aforementioned flange portion 40 as well as a central upstanding generally tubular projection 48. The cover 46, in the portion located below and laterally outwardly of the projection 48, has a number of inlet openings 50 therethrough. By comparison with FIG. 1, it can be seen that, in use, these inlets 50 lie at the bottom of filtering chamber 24 and in communication therewith. Thus, water can pass by gravity flow from the filtering chamber 24 through the inlets 50 and into the barrel 44 of the filter cannister.

The cannister 44 is packed with a filtering means or medium 52, preferably a mixture of activated carbon and a weak cation exchange resin. The bottom wall 53 of cannister barrel 44 has a number of outlet openings 54 therein. Thus, water entering the cannister 44 through inlets 50 passes through the filtering medium 52, whereby impurities are adsorbed, and thence out through the outlets 54 and into the holding chamber 16.

Suitable means, well known in the art, can be used to prevent small particles of the filtering medium 52 from entering the water in the holding chamber 16. For example, the inlet and outlet openings can be covered with a very fine mesh mechanical filter.

As impurities are thus adsorbed, the carbon portion of the filtering medium becomes saturated and loses its effectiveness for further filtering purposes. Also, unprotected by silver, which is now considered dangerous for use in connection with drinking water, bacteria can begin to grow in the filtering medium, presenting a new problem to replace that which the filtering is intended to solve.

Accordingly, there is provided a timer which is completely gravity operated, simple to use and to read, and which provides the user with a signal, which is in fact difficult to ignore, when it is time to change the filter. Use of the timer and changing thereof are further ensured by the fact that the timer is incorporated in the filter itself.

The timer includes a cylindrical tube 56 which extends centrally and vertically through the cannister 44, 46. The lower end of tube 56 is mounted in an upstanding annular rim 58 formed integrally with the bottom wall of the cannister 44. Tube 56 extends upwardly through the barrel 44 of the cannister and through the extension 48 of the cover 46. A transparent closure member 60, which may be formed for example of glass or a suitable thermoplastic, serves to close both the upper end of tube 56 and the upper end of extension 48 and to properly position or fix the upper end of tube 56. The closure 60 also forms a window in the form of a lens 62 extending across the top of tube 56, which in turn projects outwardly from the upper end of extension 48.

More particularly, the closure 60 includes an annular downwardly depending skirt 64 sized for a fairly snug fit about the outer diameter of tube 56 and a similar fit against the inner diameter of an inwardly projecting lip 48a extending integrally inwardly from extension 48. Closure 60 may also have an outwardly extending lip 66 which extends out to contact the inner diameter of extension 48 just below lip 48a for further stability.

The closure 60 also includes a central downward projection 68 having on its underside a flat seating surface for the indicator member to be described below. The outer surface of window 62 is convex so as to make the view of the indicator through the window even more conspicuous. It will be appreciated that the window 62 can be readily viewed in chamber 24 by a user simply removing the cover 42 and looking down upon the device.

The timer includes an indicator member in the form of a solid, generally cylindrical float 70 initially releasably fixed in the lower end of tube 56 in a manner to be described more fully below. The remainder of the tube 56 is substantially filled with a non-gaseous fluid 72. By "substantially filled" is meant that there is enough fluid to allow the float 70 to float thereon to a position substantially adjacent the projection 68 of the closure 60. However, if there is a small amount of air or other fluid also within the tube 56, as is sometimes desirable in order to allow for thermal expansion of the fluid without leakage, the tube 56 would still be considered "substantially filled" with the fluid, as that term is used herein.

The fluid 72 must have a specific gravity different from that of the float 70. Because of the nature of the use of this timer and, in particular, the fact that it is highly desirable that the user be able to read the indicator when looking down on the device, it is highly preferred that the specific gravity of the float 70 be less than that of the fluid 72 so that the travel of the float 70 in use will be upward. However, it is conceivable that arrangements might be devised in which filter timers for this purpose could have indicators which move downardly in use.

The size of the clearance between float 70 and tube 56, coupled with the length of the cylindrical side walls of float 70 is chosen so that float 70 will remain in the orientation shown during its travel, specifically with a stub 74 projecting endwise from the main body of float 70 uppermost. Stub 74 has an end surface 76 which is sized and configured to mate with the seating surface defined by the bottom of projection 68, and this surface 76 is preferably pigmented for easier viewing through window 62. In addition, the fluid 72 may be pigmented in a contrasting color. Thus, for example, the fluid 72 might be green, whereas the surface 76 might be red. Then, any time the user opens the cover 42 and sees that the window 62 shows red rather than green, it will be readily apparent that it is time to replace the filter 38.

The relative properties of the float 70, the fluid 72 and the tube 56 are chosen so that the time it takes for the float 70 to move from the lower end of tube 56 to the upper end will correspond to the useful and helpful life of the filtering medium 52. "Correspond," as used herein, does not necessarily mean that the time of travel of the float 70 is exactly equal to the life of the medium. Indeed, it is preferable that the time of travel of the float 70 be somewhat less than the projected life of the medium, as a safety measure. For a typical household drinking water filter, the time of travel of the float might be on the order of thirty (30) to forty-five (45) days.

Several relative physical and chemical properties can be used to adjust this timing. Clearly, the specific gravity of the float 70 and fluid 72 must be different, or the float will not move at all However, by varying the degree of difference in specific gravity, the timing can be affected.

However, in many preferred embodiments, particularly because of the relatively long time desired for the stroke of the float 70, it is desirable to also utilize other relative properties. For example, the viscosity of the fluid 72, which can be but is not necessarily a function of specific gravity, can be used to control the speed of travel of the float 70. In conjunction with this, it can be seen that the physical properties of the tube 56 relative to the float 70 can also come into play. For example, even if the fluid 72 is very viscous, if there is a large clearance between the float 70 and tube 56, the float could move more rapidly than if there is a small clearance. Thus, the relative sizes of the float and tube, whether or not the inner surface of the tube and the outer surface of the float are of mating configurations, and the length of the portion of the float having the largest diameter, can all be used to further refine the timing.

At least some of these properties, notably viscosity, vary with temperature. In the system described in aforementioned U.S. Pat. No. 4,228,649, pains were taken to make the travel time of the indicator independent of temperature. However, in the present invention, the temperature/viscosity relation, which exists for many suitable fluids, can be used to advantage to provide a self-adjusting travel time. Thus, for example, by use of a suitable fluid whose viscosity varies inversely with temperature, it can be ensured that the travel time will be shorter in warmer environments where microbial growth would begin sooner. In an exemplary embodiment, the fluid may comprise polydimethylsaloxane.

It is important for the sake of accurate timing that the float 70 be released for movement as soon as the filter is put into service, but not prematurely. Also, because this device is for consumer use, the means of releasing the float should be simple to operate and fairly conspicuous.

To these ends, the lower end of tube 56 is provided with a closure in the form of a self-healing seal 78. This seal may be comprised of a suitable elastomer, such as the type which is used to seal the tops of medicine vials from which liquids are extracted by hypodermic syringes.

Referring now also to FIG. 4, a retainer pin 82 extends upwardly through the seal 78 and into an elastomeric lower part 70a of float 70. This releasably retains float 70 adjacent the lower end of tube 56. A grip 84 is connected to the outer end of pin 82 and extends downwardly through a hole 80 in the bottom of cannister barrel 44 and projects downwardly from the filter by a substantial distance. Conspicuous indicia, such as red or other brightly colored arrows 86, are imprinted on the grip 84 to remind the user to pull downwardly on the grip when placing the filter into service.

FIG. 5 shows what happens when this is done. The pin is removed from the part 70a and from the seal 82, which immediately seal in upon the prior locus of the pin to prevent leakage. The float 70 then begins to move upwardly until its stub 74 finally seats against the underside of window 62 as shown in FIG. 3. Then, the user will soon notice the change in color seen through window 62, and will be reminded to replace the filter.

Figures 6, 7, 8:
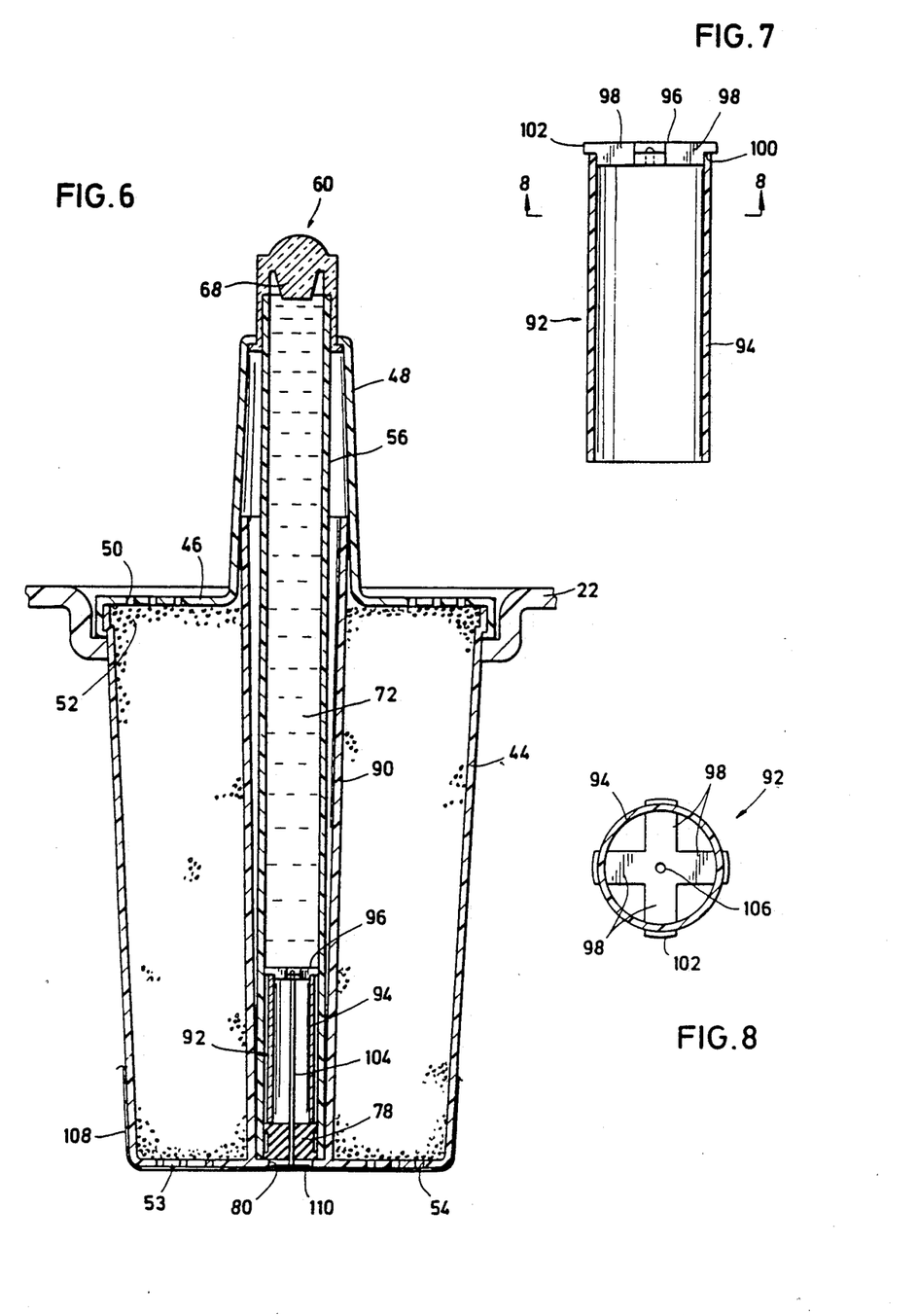
FIG. 6 is a longitudinal cross-sectional view of a second embodiment of filter.
FIG. 7 is an enlarged longitudinal cross section of the indicator member of the embodiment of FIG. 6.
FIG. 8 is a transverse view on the line 8—8 of FIG. 7.

FIGS. 6-8 illustrate another embodiment of filter assembly according to the present invention. Many of the parts of this second filter assembly are similar to those of the first embodiment described above, and to that extent, the same reference numerals have been used to designate similar parts.

In the embodiment of FIG. 6, the barrel 44 of the cannister differs from that of the preceding embodiment in that, instead of the small rim 58, there is, molded integrally with barrel 44, an upstanding tubular sheath 90 which extends upwardly the full length of barrel 44, and preferably beyond that into cover projection 48.

Since, in order to mold the sheath 90, and more specifically to remove the barrel from the mold, the sheath 90 must have at least a small drift angle, it cannot be used as the timer tube per se, because a non-uniform inner diameter of the timer tube would make proper timing difficult to the extent that it is affected by the clearance with the indicator member. However, the sheath 90 can facilitate assembly of the filter in that, when the filtering medium 52 is emplaced in the barrel, the sheath 90 will prevent the filtering medium from entering the place where the tube 56 for the timer needs to be inserted. Then, the tube 56, along with the cover 46, can be emplaced, the tube 56 passing down along sheath 90 until its lower end rests on the bottom wall 53 of the barrel inside sheath 90. This abutment retains tube 56 from further downward movement, while cover 46 and the associated closure 60 prevent upward displacement of tube 56.

Another difference in the embodiment of FIGS. 6-8 is in the form of the indicator member 92. Various factors which affect the timing of the stroke of the indicator member have been discussed above, and it has been mentioned that, in connection with the solid cylindrical float 70 of the first embodiment, its clearance with the timer tube 56 is one such factor. However, properly timing the float's travel by a suitable clearance and length of the float can present difficulties In addition, the clearance between the outside of the indicator member and the inside of the timer tube is preferably carefully controlled so as to allow sufficient freedom of movement but with a good centering action.

In the embodiment of FIGS. 6-8, the indicator member or float 92 is not solid, as in the first embodiment, but rather has lengthwise flowway means for passage of the fluid 72. More specifically, referring to FIGS. 7 and 8, the float 92 is of two part construction. The major portion is a cylindrical sleeve 94. The other portion is a gauge portion 96 located at the upper end of sleeve 94.

Even more specifically, the gauge portion 96 is cruciform in transverse configuration, having four radiating arms 98. As shown in FIG. 7, each arm 98 is undercut at its outer end as indicated at 100. The thicker, innermost parts of the arms 98 are sized to be press fit into the upper end of sleeve 94, with the upper end of the sleeve fitting into the undercuts 100. The thin outer portions of the arms 98 are sized to project radially outwardly beyond the outer diameter of sleeve 94, as indicated at 102, and their amount of such extension, i.e. the maximum transverse dimension of gauge portion 96, as measured along two diametrically opposed arms, can be carefully controlled so as to provide the proper centering action of the entire float 92. This eliminates the need to size the entire sleeve 94 for such centering. Thus, the sleeve 94, which represents the bulk of the float 92, can be inexpensively made.

Also, because the rate of travel of the float 92 is dependent, among other factors, on the total transverse cross-sectional area of the float, and because that area is not solid, but rather has lengthwise flowway means, cross-sectional area can be used to help time the stroke of the float 92 by providing for the flow phenomena to be at least partially of the couette type, rather than mainly of the poiseuille type. This, in turn, lessens the criticality of the tolerances between the outer surface of the float and the inner diameter of the timer tube 56. More specifically, the flowway means comprises the interior of the sleeve 94, and the spaces between the arms 98 which, as shown in FIG. 8, communicate with the interior of sleeve 94.

Referring again to FIG. 6, since float 92 is hollow at the bottom, a retainer pin 104 extends all the way up through the sleeve 94 and into a socket 106 (see FIG. 8), in the gauge portion 96 of the float 92.

The embodiment of FIG. 6 is also provided with a means to ensure automatic removal of pin 104, and thus activation of the timer, when the filter is put into use. More specifically, when new, the filter assembly shown in FIG. 6 is enclosed in a package, in this case in the form of a flexible wrapping. This packaging may be aseptic. The outer end of pin 104 has a disk-like head 110, which is exposed through the hole 80 in the cannister barrel 44 and affixed, as by adhesive, to the wrapping 108. Thus, when the wrapping 108 is removed to place a new filter into use, the pin 104 will be removed with it. Although, in the embodiment shown, assembly is facilitated by positioning the pin head 110 inside the package 108 and affixing it thereto by an adhesive, it might be possible, in other embodiments, to have the pin 104 extend through the wrapping or packaging, with the head 110 on the exterior of the wrapping, to achieve a similar automatic removal result.

A number of the advantages of the invention have been brought out in the course of the above discussion. To these it might be added that the system is completely gravity operated, requiring no external power source. It is simple and practical for consumer use and it resolves many of the problems explained above which have been found in prior water filtration devices as well as deficiencies in prior timer devices which were not tailored for this particular use. Still other advantages will be apparent from the overall disclosure.

It will also be apparent that various modifications might be made to the embodiments described above within the spirit of the invention. It is therefore intended that the scope of the invention be limited only by the claims which follow.

What is claimed is:

1. A timing device for a water filtration system comprising:
    a tube having upper and lower ends;
    a transparent window across the upper end of the tube and disposed for visibility from above the device;
    an indicator member in the tube and sized for lengthwise movement in the tube;
    a non-gaseous fluid substantially filling the portion of the tube not occupied by the indicator member and having a specific gravity greater than that of the indicator member.

2. The device of claim 1 wherein the indicator member has a pigmented surface readily visible through the window when disposed adjacent thereto.

3. The device of claim 2 wherein the fluid is pigmented to contrast with the pigmented surface of the indicator member.

4. The device of claim 2 wherein the window has a seating surface on its underside configured to mate with the pigmented surface of the indicator member, and the indicator member has lateral surfaces sized and configured to cooperate with the inner surfaces of the tube to maintain the pigmented surface in an uppermost disposition.

5. The device of claim 4 wherein the seating surface is formed on a downward projection of the window.

6. The device of claim 4 wherein the seating surface and the pigmented surface are flat.

7. The device of claim 1 further comprising releasable retainer means for temporarily holding the indicator member adjacent the lower end of the tube.

8. The device of claim 7 further comprising a self-healing seal disposed in a wall of the tube and closing the tube adjacent its lower end; and the retainer means comprising a retainer pin extending through the seal and into the indicator member.

9. The device of claim 8 further comprising a grip attached to the retainer pin and extending externally of the tube.

10. The device of claim 1 wherein the viscosity of the fluid decreases with increasing temperature.

11. A timing device for a water filtration system comprising:
    a tube having upper and lower ends;
    an indicator member in the tube and sized for lengthwise movement in the tube, the indicator member having at least one lengthwise flowway;
    a non-gaseous fluid substantially filling the portion of the tube not occupied by the indicator member and having a specific gravity greater than that of the indicator member.

12. The device of claim 11 wherein the indicator member has a gauge portion whose maximum transverse dimension is sized to provide a desired clearance with the tube.

13. The device of claim 12 wherein the gauge portion occupies a relatively small portion of the total length of the indicator member and has a maximum transverse dimension greater than that of the remainder of the indicator member.

14. The device of claim 13 wherein a major portion of the indicator member is in the form of a hollow sleeve, and wherein the gauge portion defines projections extending radially outwardly from the major portion.

15. The device of claim 14 wherein the gauge portion is formed by a gauge element fixed to one end of the sleeve and defining lengthwise passage means communicating with the interior of the sleeve.

16. A timing device for a water filtration system, comprising:
    an elongate tube having upper and lower ends;
    an indicator member in the tube and sized for lengthwise movement in the tube;
    a non-gaseous fluid substantially filling the portion of the tube not occupied by the indicator member and having a specific gravity different than that of the indicator member;
    a self-healing seal disposed in a wall of the tube and closing the tube adjacent one end thereof; and
    a retainer pin removably extending through the seal and into the indicator member.

17. The device of claim 16 further comprising a grip attached to the retainer pin and extending externally of the tube.

18. The device of claim 17 wherein the specific gravity of the fluid is greater than that of the indicator member and the seal is disposed adjacent the lower end of the tube.

19. The device of claim 16 wherein the viscosity of the fluid decreases with increasing temperature.

20. A water filter comprising:
    a cannister having upper and lower ends and containing filtering means having a limited life, the cannister having inlet means and outlet means disposed below the inlet means;
    a tube connected with the cannister and having upper and lower ends;
    an indicator member in the tube and sized for lengthwise movement in the tube;
    a non-gaseous fluid substantially filling the portion of the tube not occupied by the indicator member and having a specific gravity different than that of the indicator member; and
    wherein the relative physical properties of the indicator member, the fluid and the tube are adapted to time the travel of the indicator member along the length of the tube to correspond to the life of the filter means.

21. The filter of claim 20 wherein the specific gravity of the fluid is greater than that of the indicator member, and the upper end of the tube projects above the filtering means.

22. The filter of claim 21 further comprising a transparent window across the upper end of the tube and disposed for visibility from above the filter.

23. The filter of claim 22 wherein the indicator member has a pigmented surface readily visible through the window when disposed adjacent thereto.

24. The filter of claim 23 wherein the fluid is pigmented to contrast with the pigmented surface of the indicator member.

25. The filter of claim 23 wherein the window has a seating surface on its underside configured to mate with the pigmented surface of the indicator member, and the indicator member has lateral surfaces sized and configured to cooperate with the inner surfaces of the tube to maintain the pigmented surface in an uppermost disposition.

26. The filter of claim 25 wherein the seating surface is formed on a downward projection of the window.

27. The filter of claim 25 wherein the seating surface and the pigmented surface are flat.

28. The filter of claim 22 further comprising releasable retainer means for temporarily holding the indicator member adjacent the lower end of the tube.

29. The filter of claim 28 further comprising a self-healing seal disposed in a wall of the tube and closing the tube adjacent its lower end; and the retainer means comprising a retainer pin extending through the seal and into the indicator member.

30. The filter of claim 29 further comprising a grip attached to the retainer pin and extending externally of the tube.

31. The filter of claim 20 further comprising a self-healing seal disposed in a wall of the tube and closing the tube adjacent the lower end thereof, and a retainer pin removably extending through the seal and into the indicator member.

32. The filter of claim 31 further comprising a grip attached to the retainer pin and extending externally of the tube.

33. The filter of claim 32 wherein the seal is disposed adjacent the lower end of the tube.

34. The filter of claim 31 being enclosed in a removable package, and including a link member interconnecting the retainer pin and the package so that the pin is automatically removed when the package is removed.

35. The filter of claim 20 wherein the viscosity of the fluid decreases with increasing temperature.

36. The filter of claim 20 wherein the indicator member has at least one lengthwise flowway.

37. The filter of claim 36 wherein the indicator member has a gauge portion whose maximum transverse dimension is sized to provide a desired clearance with the tube.

38. The device of claim 37 wherein the gauge portion occupies a relatively small portion of the total length of the indicator member and has a maximum transverse dimension greater than that of the remainder of the indicator member.

39. The device of claim 38 wherein a major portion of the indicator member is in the form of a hollow sleeve, and wherein the gauge portion defines projections extending radially outwardly from the major portion.

40. The device of claim 39 wherein the gauge portion is formed by a gauge element fixed to one end of the sleeve and defining lengthwise passage means communicating with the interior of the sleeve.

41. A water filtration system comprising:
a primary container having a bottom wall and side walls defining a holding chamber;
a secondary container defining a filtering chamber having upper and lower ends, the secondary container being mounted on the primary container at least partially within the holding chamber but with the filtering chamber spaced above the bottom wall of the primary container; and
a filter assembly connected to the secondary container and comprising
a cannister containing filter means disposed generally below the lower end of the filtering chamber, the cannister having inlet means communicating with the filtering chamber and outlet means disposed below the inlet means and communicating with the holding chamber,
and a gravity-operated timer connected with the cannister and operative to produce a visible indication, visible from above the primary container, when the filter means nears the end of its life.

42. The system of claim 41 wherein the timer has a viewing portion for viewing the visible indication, the viewing portion being disposed substantially above the lower end of the filtering chamber.

43. The system of claim 42 wherein the timer comprises:
a tube connected with the cannister and having upper and lower ends, the upper end comprising the viewing portion;
an indicator member in the tube and sized for lengthwise movement in the tube;
a non-gaseous fluid substantially filling the portion of the tube not occupied by the indicator member and having a specific gravity less than that of the indicator member; and
wherein the relative physical properties of the indicator member, the fluid and the tube are adapted to time upward travel of the indicator member along the length of the tube to correspond to the life of the filtering means.

44. The system of claim 43 wherein the timer further comprises a transparent window across the upper end of the tube and disposed for visibility from above the filter.

45. The system of claim 44 wherein the indicator member has a pigmented surface readily visible through the window when disposed adjacent thereto.

46. The system of claim 45 further comprising releasable retainer means for temporarily holding the indicator member adjacent the lower end of the tube.

47. The system of claim 46 further comprising a self-healing seal disposed in a wall of the tube and closing the tube adjacent its lower end; and the retainer means comprising a retainer pin extending through the seal and into the indicator member.

48. The system of claim 47 wherein the filter assembly is enclosed in a removable package, and including a link member interconnecting the retainer pin and the package so that the pin is automatically removed when the package is removed.

49. The system of claim 41 wherein the timer comprises:
a tube connected with the cannister and having upper and lower ends;
an indicator member in the tube and sized for lengthwise movement in the tube;
a non-gaseous fluid substantially filling the portion of the tube not occupied by the indicator member and having a specific gravity different from that of the indicator member;
a self-healing seal disposed in a wall of the tube and closing the tube adjacent one end thereof;

and a retainer pin removably extending through the seal and into the indicator member;

wherein the relative physical properties of the indicator member, the fluid and the tube are adapted to time the travel of the indicator member along the length of the tube to correspond to the life of the filter means.

50. The system of claim 41 wherein the filter assembly is removably connected to the secondary container.

51. The system of claim 43 wherein the viscosity of the fluid decreases with increasing temperature.

52. The system of claim 40 wherein the indicator member has at least one lengthwise flowway.

* * * * *